United States Patent
Stolwijk et al.

(10) Patent No.: US 12,311,306 B2
(45) Date of Patent: May 27, 2025

(54) GAS PHASE SETTLING (GPS) TRAY

(71) Applicant: SHELL OIL COMPANY, Houston, TX (US)

(72) Inventors: Johannis Desiderius Stolwijk, Amsterdam (NL); Julien Sigaud, Amsterdam (NL); Edwin Maas, Houston, TX (US)

(73) Assignee: SHELL USA, INC., Houston, TX (US)

( * ) Notice: Subject to any disclaimer, the term of this patent is extended or adjusted under 35 U.S.C. 154(b) by 427 days.

(21) Appl. No.: 17/913,886

(22) PCT Filed: Apr. 26, 2021

(86) PCT No.: PCT/EP2021/060866
§ 371 (c)(1),
(2) Date: Sep. 23, 2022

(87) PCT Pub. No.: WO2021/219565
PCT Pub. Date: Nov. 4, 2021

(65) Prior Publication Data
US 2023/0124860 A1    Apr. 20, 2023

Related U.S. Application Data

(60) Provisional application No. 63/015,706, filed on Apr. 27, 2020.

(51) Int. Cl.
*B01D 46/24* (2006.01)
*B01D 46/00* (2022.01)
(Continued)

(52) U.S. Cl.
CPC ...... *B01D 46/2411* (2013.01); *B01D 46/0041* (2013.01); *B01D 46/106* (2013.01); *B01D 50/20* (2022.01); *B01D 2273/10* (2013.01)

(58) Field of Classification Search
CPC .......... B01D 46/24–2414; B01D 50/20; B01D 2273/10; B01D 46/0041; B01D 46/106
See application file for complete search history.

(56) References Cited

U.S. PATENT DOCUMENTS

| | | |
|---|---|---|
| 7,600,742 B2 | 10/2009 | Breivik |
| 8,329,974 B2 | 12/2012 | Koudil et al. |

(Continued)

FOREIGN PATENT DOCUMENTS

| | | |
|---|---|---|
| CN | 1765479 A | 5/2006 |
| CN | 108097177 A | 6/2018 |
| EP | 0358923 A1 | 3/1990 |

OTHER PUBLICATIONS

International Search Report and Written Opinion received for PCT Patent Application No. PCT/EP2021/060866, mailed on Jun. 11, 2021, 9 pages.

(Continued)

*Primary Examiner* — Robert Clemente
(74) *Attorney, Agent, or Firm* — SHELL USA, INC.

(57) ABSTRACT

A device for filtering and settling entrained particles from a gas feed stream, the device comprising a cylindrical v-wire filter element to filter the entrained particles, a cap located above the v-wire filter element comprising an outer surface, an under surface, and a downward rim attached to a perimeter of the under surface, and an open annulus area located between and in fluid communication with an open top portion of the v-wire filter element and the under surface of the cap.

16 Claims, 4 Drawing Sheets

(51) Int. Cl.
    *B01D 46/10*        (2006.01)
    *B01D 50/20*        (2022.01)

(56) References Cited

U.S. PATENT DOCUMENTS

| | | |
|---|---|---|
| 9,061,232 B2 | 6/2015 | Oh et al. |
| 10,328,407 B2 | 6/2019 | Zahirovic et al. |
| 2003/0226793 A1 | 12/2003 | Merritt et al. |
| 2013/0092798 A1 | 4/2013 | Boyce |
| 2017/0128901 A1 | 5/2017 | Maas et al. |
| 2020/0197842 A1 | 6/2020 | Loehl |

OTHER PUBLICATIONS

Office Action Received for European Application No. 21722409.6, Mailed on Oct. 13, 2023, 4 Pages.
Office Action Received for Chinese Application No. 202180028266.5, Mailed on Dec. 6, 2023, 18 Pages(09 Pages of English Translation and 09 Pages of Official Copy).

GAS PHASE SETTLING (GPS) TRAY

CROSS REFERENCE TO RELATED APPLICATIONS

This is a National stage application of International application No PCT/EP2021/060866, filed 26 Apr. 2021, which claims priority of U.S. Provisional application No. 63/015,706, filed 27 Apr. 2020 which is incorporated herein by reference in its entirety.

FIELD OF INVENTION

The present invention relates to a device and method for removing entrained particles from an inlet gas feed stream, more particularly, the present invention describes a Gas Phase Settling (GPS) tray installed in a reactor, and method of using thereof, for removing entrained particles from a gas-phase only feed stream.

BACKGROUND

There is an increasing awareness in the oil refining industry to improve reactor unit performance and profitability by installing the latest-generation of reactor internals. However, such reactor internals are often susceptible to fouling issues, i.e., accumulation of unwanted solid particle deposits, due to a variety of circumstances including the processing of hydrocarbon feeds at elevated temperatures and pressures. Fouling, as such, can negatively impact a process by reducing heat transfer and increasing flow resistance, pressure drop, and mechanical damage, among other problems.

Fouling is caused by the accumulation of solid particle deposits that become trapped in unit equipment, such as reactors (more specifically, within catalyst beds of a reactor), heat exchangers, air coolers, separators, and compressors. Such fouling solid deposits comprise a broad range of natures and sources such as catalyst fines, inorganic scales, corrosion and polymerization products, salts, coke, dirt, sand, organic growth and organic sediments. The morphology of the solid deposits may range from sludge (i.e., settled particles) to hard carbonaceous layers and scale.

Experience has shown that just a dense, 5 to 10-millimeter (mm) layer of catalyst fines atop of a catalyst bed, as an example, can cause excessive pressure-drop, flow maldistribution or total plugging. Such resultant issues may lead to shorter run lengths, unplanned downtime costs, unused catalyst activity, increased maintenance and lost revenue, thus, leading to overall lower performance and process inefficiencies. Devices and methods for reducing fouling are known in the art. For example, various configuration of filtration trays, particle separators, and graded catalyst bed technologies, among others, claim to reduce the effects of fouling.

U.S. Pat. No. 8,329,974 discloses a filtration tray for a fixed bed reactor with a co-current down-flow of gas and liquid. The tray may trap particles contained in a liquid feed supplied to a reactor functioning in a gas/liquid co-current down-flow mode using a specified distributor tray comprising a filtration medium. The tray is most applicable to the selective hydrogenation of feeds containing acetylenic and dienic compounds.

U.S. Pat. No. 10,328,407 discloses a catalytic chemical reactor with particle separation that can be used to selectively separate particles of certain aerodynamic diameters. Particles are separated from an inlet fluid stream by trapping the particles in a region of quasi static flow and diverting particle momentum from regions of high and low quasi static gas velocities.

EP0358923 discloses a process and an apparatus for purifying a raw gas of granular and dusty solids particles before entry into downstream cooling devices. The raw gas is passed in a first purification stage from the gasification zone, whereby the solids particles are precipitated at the bottom of the gas-holding space. Thereafter, in a second purification stage, the partially purified raw gas is laterally deflected from the gas-holding space and undergoes a change to a velocity reduced by a factor of at least 3. After a further gas deflection, the raw gas is passed substantially in the vertical direction through a solids filter, where the dusty solids particles are removed therein.

Despite these and others measures, continual advancements for reducing fouling are still needed in view of heavier feedstock processing and ever-more stringent product specifications. Enhancements in fouling-abatement devices, systems, and methods can provide more desirable alternatives to conventional abatement techniques, including improvements related to reducing pressure drop increase, maximizing catalyst activity, extending run-lengths of process units, and eliminating flow maldistribution.

SUMMARY OF THE INVENTION

It has now been advantageously found that the present invention relates to a GPS tray, comprising a filter device, that overcomes the above described problems and provides fouling-abatement improvements. The GPS tray may be installed in a downflow catalytic reactor and comprises a plurality of filter devices for trapping particles entrained within an inlet gas feed stream, by particle filtration and settling. Each filter device of the GPS tray comprises a cylindrical v-wire filter element to filter the entrained particles, where the v-wire filter element comprises slits and a hollow internal passage. A first portion of gas stream flows radially through the slits to form a filtered gas stream and a hollow internal passage of the filter element receives the filtered gas stream. The filter device further comprises a cap located above the v-wire filter element and comprising an outer surface and an under surface. The filter device further comprises an open annulus area located between and in fluid communication with an open top portion of the v-wire filter element and the under surface of the cap, where a second portion of gas feed stream flows upward along a length of the v-wire filter element, into the open annulus area and downward into the hollow internal passage.

The present invention further relates to a method for removing entrained particles from an inlet gas feed stream flowing into a downflow catalytic reactor by flowing the inlet gas feed stream into a top inlet of the catalytic reactor and subjecting the inlet gas feed stream to the aforementioned gas-phase settling (GPS) tray installed within the reactor.

DESCRIPTION OF THE DRAWINGS

Certain exemplary embodiments are described in the following detailed description and in reference to the drawings, in which.

DETAILED DESCRIPTION

Figure 1:
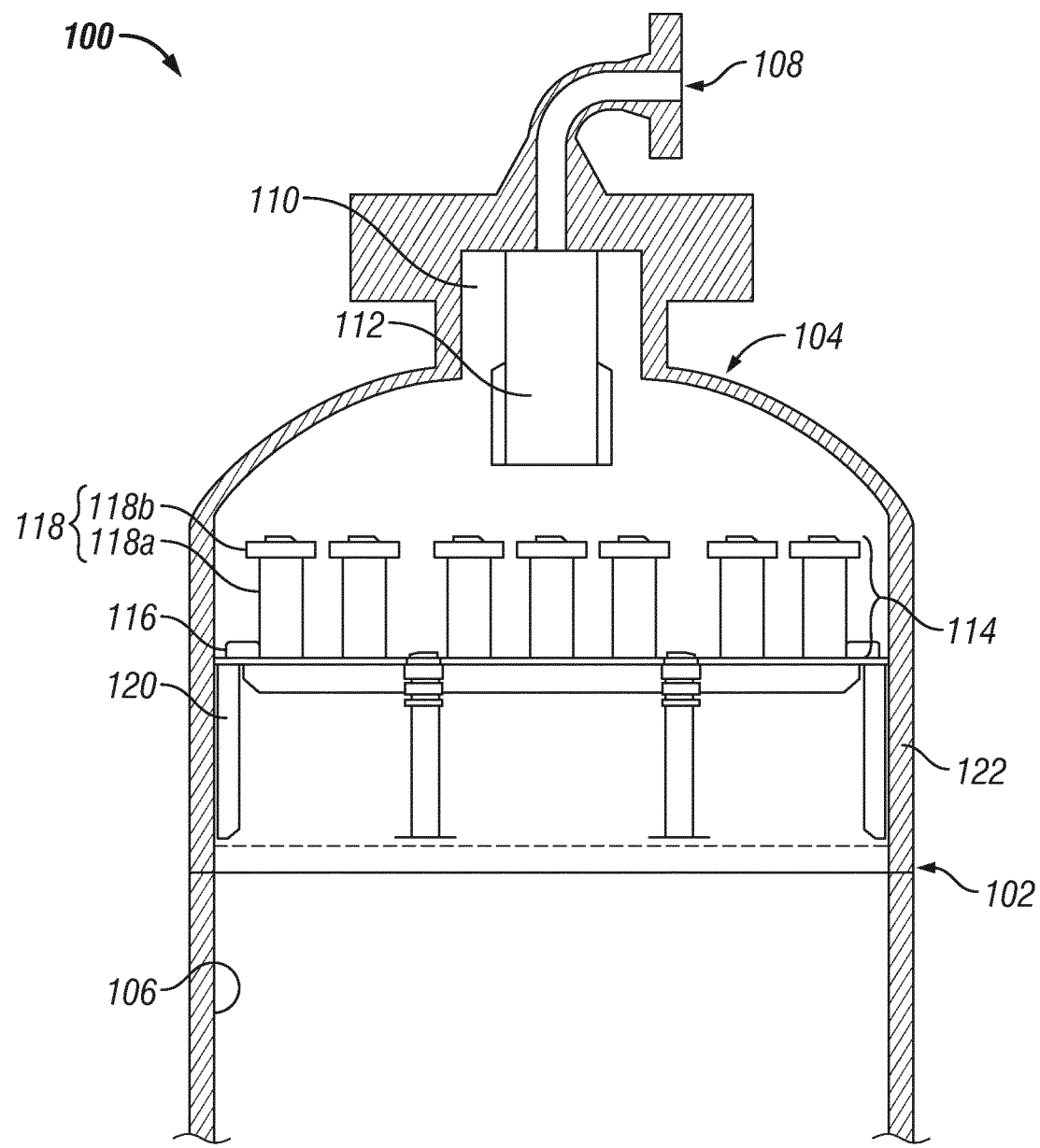
FIG. 1 is a schematic representation of a vertical cross-section of a reactor vessel comprising a GPS tray located in an upper portion of the vessel, in accordance with the present invention.

The present invention aims to solve the problems encountered in the prior art due to fouling particles that often plague reactor systems. The invention therefore describes a novel filtration tray, i.e., a Gas-Phase Settling (GPS) tray, comprised of a plurality of filter devices, capable of reducing fouling in catalyst bed(s) by removing small-scale solid particles within a gas-phase feed.

According to the invention, the ("GPS tray") has been found to trap small scale solids and solid particles, herein referred to as "solids", in a predominantly gas-phase only feed. As used herein, the terms "majority", "mainly" and "predominantly" will mean more than 80%, preferably 90%, and more preferably 100%. In preferred embodiments, the feed is a 100% gas-phase stream. As one of its main objectives, the GPS tray removes small-scale solids (as defined herein as solids with a diameter of at least 10 microns (μm)) from the gas-phase feed where a portion of the solids with a diameter of less than 100 μm are trapped and where a majority of the solids with a diameter over 100 μm are trapped by the GPS tray. Preferably, 100% of the solids with a diameter over 100 μm are trapped by the GPS tray. In addition to incorporating a particle filtration function through the use of a v-wire screen (i.e., wedge wire screen) to trap/remove the entrained solids from the feed, the GPS tray of the present embodiments induces settling of the trapped solids and particle storage capacity. Without the GPS tray, the solids in the gas-phase feed settle within the catalyst bed leading to premature reactor plugging and increased reactor pressure drop, thus, significantly limiting the run length of the unit. Therefore, other advantages of the invention will be highlighted by examples, including delaying pressure drop increase.

The GPS tray can be used to treat any gas-phase feeds, preferably, hydrocarboneous feeds, contaminated with solids with a diameter of at least 10 μm where it is desirable to remove such solids from the feed before further processing occurs. An example of where the present GPS tray may be suitably used includes a hydrocarbon gas-phase feed stream containing catalyst fines, such as hydrotreatment of a slurry oil from a catalyst cracker where the slurry oil contains solid contaminant particles. Such hydrotreatments include, without limitation, hydrogenation, hydrocracking, hydrodemetallization, hydro-desulphurization, hydro-denitrification, and/or the like.

The GPS tray may be suitable for use in various downflow reactors including a catalytic reactor, or any other type of vessel that is subjected to solid particles, including fines, scale, sediments, contaminants, or the like. The GPS tray can be installed in the unoccupied space of the upper, or top, dome of the vessel without being bolted, mounted or welded to an internal surface of the vessel. For example, the GPS tray may be installed in the upper dome of a reactor since fouling of top catalyst beds is often expected and experienced during processing. Since the GPS tray is installed in the top dome of the reactor, the volume of catalyst loaded into the reactor is maximized.

The GPS tray, fitted on a tray deck, is fitted with a number of filter devices for trapping and settling the entrained solids within the gas-phase feed. The body of each device includes a cylindrical v-wire filter screen (herein referred to as "filter element") configured to filter, i.e., trap, the entrained solids. The filter element includes v-shaped profile wires (i.e., v-wire screen) and wire support rods, where the wire used can be either axial or radial in nature. The commercially available filter element is made by winding the wires around the support rods to form a hollow internal passage and a series of slits, or gaps, between the wires. The slits between the wires of the filter element may be selected to exclude the solids from passing, but not configured to prevent solids entrained within the feed from plugging the filter element. In the present embodiments, a portion of the solids with a diameter of less than 100 μm are trapped by the v-wire screen and a majority of the solids with a diameter over 100 μm are trapped by the v-wire screen. Preferably, 100% of the solids with a diameter over 100 μm are trapped since the v-wire screen comprises a slit width of about 100 μm.

The diameter of the hollow internal passage of the cylindrical filter element is such that the pressure-drop over the GPS tray is minimal (e.g., few millibars). To add, the slits of the v-wire screen-allow for self-draining of any liquid settling on the tray in an effort to avoid liquid accumulation. With the exception of openings in the GPS tray panels, there are no other passageways on the GPS tray through which gaseous vapors can flow when the tray is correctly installed in the reactor.

Each filter device consists of a solid metal circular cap with a downward rim, mounted on top of the filter element, where the diameter of the cap is larger than the diameter of the filter element. The top section of the filter element is not made of v-wire but is a, solid circular metal ring that is securely attached to the top section of the filter element. To add, the diameter of the solid circular metal ring corresponds with the diameter of the v-wire screen to form a wholly, singular filter element body.

The bottom edge of the top section of the filter element (i.e., the solid circular metal ring) extends so as to correspond with the bottom edge of the downward rim of the cap. Therefore, part of the gas flows radially through the slits of the v-wire screen of the filter element and the remaining gas flows upwards through an open annular section between the rim of the cap and the top section of the filter element. The upward flow of gas, impinges with the underside of the cap and has then no other choice but to flow downwards through the hollow section of the filter element . . . . It should also be noted that the dimensions of the cap, slit width of the v-wire screen, and height of the filter element can be adjusted to impact the cut point diameter of the entrained solid particles filtered by the GPS tray. Such adjustments in dimensions may depend on the particle size distribution of the fouling material and on the nature of the fouling material.

The aforementioned tray deck, which can hold a series of filter devices, refers to a planar surface made of a number of flat panels located within the reactor and upon which one or more filter elements are supported. Depending on the configuration of the reactor, the tray deck may be comprised of one or more flat panels as provided by other embodiments. Typically, each panel of the tray deck comprises an aperture, i.e., opening, so that the hollow internal passage of a filter element aligns with an opening of a corresponding panel. This configuration facilitates downward passage of the gas-phase feed further into the vessel so as to contact catalyst beds located within the reactor chamber of the vessel.

In the present embodiments, a majority of the gas-phase feed flows radially through the slits of the filter device to filter a substantial volume of the entrained solids from the feed. A majority of the solids with a diameter over 100 µm are trapped by the v-wire screen. Preferably, 100% of the solids with a diameter over 100 µm are trapped. In this regard, any solids larger than 100 µm that are entrained by in the gas-phase feed flowing radially through the filter element are filtered (i.e., prevented) from passing through the slits and, therefore, settle on the tray deck of the GPS tray. Once filtered, a filtered gas stream (i.e., free of entrained small-scaled solids) flows downward into the hollow internal passage of the filter device and further down into the reactor. Another portion of gas-phase feed flow upwards along the outer perimeter of the filter element, into the annulus area, and downward into the hollow internal passage of the filter element to mixes with the filtered gas stream, where this mixed stream of gas flows further down in the reactor. During the inventive process, the proportion of gas-phase feed flowing radially through the slits may be adjusted by varying its flow rate to limit the portion of gas that flows upwards so that no particles with a diameter larger than 100 microns are lifted. Specifically, the flow rate of the gas-phase feed flowing radially through the slits is greater than the flow rate of the gas-phase feed that flows upwards.

The synergistic behavior that the inventive GPS tray exhibits is generated by several factors, including, the placement of each filter device on the tray deck and also by incorporating each filter device with a v-wire filter element. Use of the v-wire filter elements allows for filtering of smaller sized solids entrained in the feed, as compared to solids trapped by conventional fouling-abatement trays. Additionally, since a majority (i.e., first portion) of gas is flowing radially through the slits of the filter element, the upward flow of gas (i.e., second portion) is much lower than for a conventional fouling abatement tray. The inventive embodiments provide advantageous results since the diameter of the cap mounted on top of the filter element is such that the velocity of the upward flow of gas is low enough to ensure that any particle bigger than 100 µm, settle on the tray instead of being entrained to flow through the hollow internal passage of the filter element and therefore further down in the reactor. It is important to notice that depending on the particle size distribution of the solids present in the gas-phase feed, the size of the slits of the v-wire screen can be adjusted along with the design parameters of the GPS tray (i.e., number of filter elements, diameter of cap, height of filter elements, diameter of filter elements). In the embodiments, the slits of the v-wire screen are at least are 4 µm or more where the slit size may be adjusted based on the particle size distribution of the fouling material.

The inventive GPS tray provide other advantages through use of v-wire filter elements since solids trapped and filtered by the GPS tray are at least four times smaller in size than particles trapped by conventional trays. In the present embodiments, the GPS tray traps a majority of solids, and preferably all of the solids with a diameter of 100 µm and above. Additionally, The GPS tray provides a larger settling volume of solids as opposed to conventional techniques. The reason being is that the height of the filter elements of the GPS tray are at least twice the height of conventional trays so that the estimated volume of accumulated fouling material on the tray is at least twice the volume accumulated by other trays. Since a larger volume of the small-scale solids is captured by the GPS tray, the volume of entrained solids that enter the reactor is significantly reduced, thereby, delaying further fouling of the reactor.

Conventional fouling-abatement trays installed above the catalyst beds often fail to trap small-scaled solids and other fouling matter smaller than 400 µm in diameter. In that case, the gas-phase feed that flows into the reactor chamber contains the entrained small-scaled solids, thereby, resulting in contamination of the catalyst beds upon contact. Yet, like conventional trays, the GPS tray limits fouling, such as fouling in catalyst beds, breaks up and distributes gas from an inlet device and any liquids (i.e., liquid carry over) during start-up, and provides overall sufficient distribution of gas to catalyst beds. Specifically, the inventive GPS tray when installed in a reactor vessel, advantageously provides exemplary fouling-abatement, including reduced pressure drop, by settling, filtering, and storing small-scale particles (i.e., any particle bigger than 100 microns) entrained within a gas-phase only feed.

FIG. 1 is a schematic representation of a vertical cross-section of a reactor vessel comprising a GPS tray located in an upper portion of the vessel, in accordance with the present invention. It is noted that the specific details of the reactor, including various internals and catalyst beds, are not discussed in detail herein for the sake of brevity since it would be understood by one of ordinary skill.

Reactor vessel 100 can be any suitable downflow vessel that facilitates contacting catalyst with a hydrocarboneous feed under suitable hydro-processing conditions well-known to one skilled in the art. In preferred embodiments, the reactor vessel 100 can be used in various types of processes including catalytic reactions such as any hydroprocessing reactions known to those skilled in the art including hydrodesulfurization, hydrodenitrogenation, hydrodemetallization, hydrocracking, and dehydrogenations.

The reactor vessel 100 of FIG. 1 includes a reactor housing 102 that includes a top portion 104 and a bottom portion (not shown). The reactor housing 102 is typically cylindrical in shape resulting in the reactor vessel 100 having a circular cross-sectional shape. The reactor housing 102 defines a reactor chamber 106 where process reactions, including catalytic reactions, take place.

A feed inlet 108, located at the top portion 104 of the reactor vessel 100, provides for initial entry of a gas-phase only feed into the reactor vessel 100. An inlet manway 110 defines an opening or conduit in the reactor vessel 100, whereby, an inlet device 112 extends through the opening defined by inlet manway 110 and into the top portion 104. The inlet device 112 allows for flow passage of the gas-phase feed from the top portion 104 of the reactor vessel 100 and further downward into the reactor housing 102.

A GPS tray 114 is situated in the top portion 104 of the reactor housing 102. The GPS tray 114 is comprised of one or more of flat tray panels that when assembled together, provide for a flat, planar surface, or tray deck 116. In other embodiments, the tray deck 116 may be created from a wholly singular material instead of a number of panels. For simplicity, only one tray deck 116 is shown, although in practice, a reactor vessel can contain multiple catalyst beds and hence multiple trays decks. The GPS tray 114 supports an array of filter devices 118 that are uniformly spaced. Each filter device 118 is comprised of a v-wire filter element and a cap, which will be later explained with respect to FIG. 2. As would be well known to one skilled in the art, each tray panel includes an aperture, or flow opening, where a corresponding v-wire filter element 118 is properly fitted directly above the aperture so that a hollow internal passage of the element 118 aligns with the aperture. In operation, the gas-phase feed enters the reactor vessel 100 byway of feed inlet 108 and through inlet device 112 where solids contaminants are filtered from the gas-phase feed via filter elements 118. A resulting filtered gas-phase feed flows from the GPS tray 114 and into the reactor chamber 106, where process reactions are initiated upon contact with the catalyst.

In the present embodiments, the series of filter devices 118 provide for the removal of entrained small-scaled solids, i.e., any solid with a diameter above 100 μm and to a lesser extent, solids smaller than 100 μm, from a portion of the gas-phase feed. Furthermore, because the inventive GPS tray 114 utilizes v-wire filter elements 118, as opposed to a solid metal plate, a portion of the gas-phase feed flows radially through slits (not shown in FIG. 1) to remove a majority, preferably all, entrained solids with a diameter of 100 μm and above. In the embodiments, filtering of the gas-phase feed using the v-wire filter elements 118 produces the filtered gas-phase feed which further flows into an internal hollow passage of the filter element (not shown in FIG. 1). Another portion of the gas-phase feed flows in an upward direction towards the cap and downward into the internal hollow passage of the filter element 118. The upwards flowrate of the gas-phase feed is lower than the radial flowrate of the gas phase feed due to the open slits in the v-wire filter elements 118. A majority, preferably all, entrained solids with a diameter of 100 μm and above in the gas-phase feed flowing upwards towards the cap so as to fall out and settle on the tray deck 116 instead of flowing upwards and into the internal hollow passage of the filter device. In this case, contamination of the catalyst located in beds located below the tray deck 116 is reduced or alleviated.

The reactor vessel 100 includes a skirt 120, located below the GPS tray 116, that extends to within close proximity to and along the circumference of an internal wall 122 of the reactor vessel 100. The skirt 120 provides means for supporting various types of reactor internal equipment, such as the GPS tray 114. In other embodiments, the skirt 120 may be replaced with other suitable structural elements that can support a load such as the aforementioned GPS tray. The reaction chamber 106 is located below the skirt 120 and contains one or more catalyst-filled beds (not shown in FIG. 1). The reactor vessel 100 may include other components as known to one skilled in the art as needed to carry out various process reactions. However, for the sake of brevity additional components will not be explained herein.

It should be noted that in addition to handling gas-phase only feeds, the inventive GPS tray 114 can also handle liquid carry-over during transient operations, such as process shutdowns, without risk of contaminating catalyst beds located below the tray 114. In operation, the liquid will flow through the open slits in the v-wire filter elements 118, while entrained particles in the liquid will remain on the tray 114.

Figure 2:
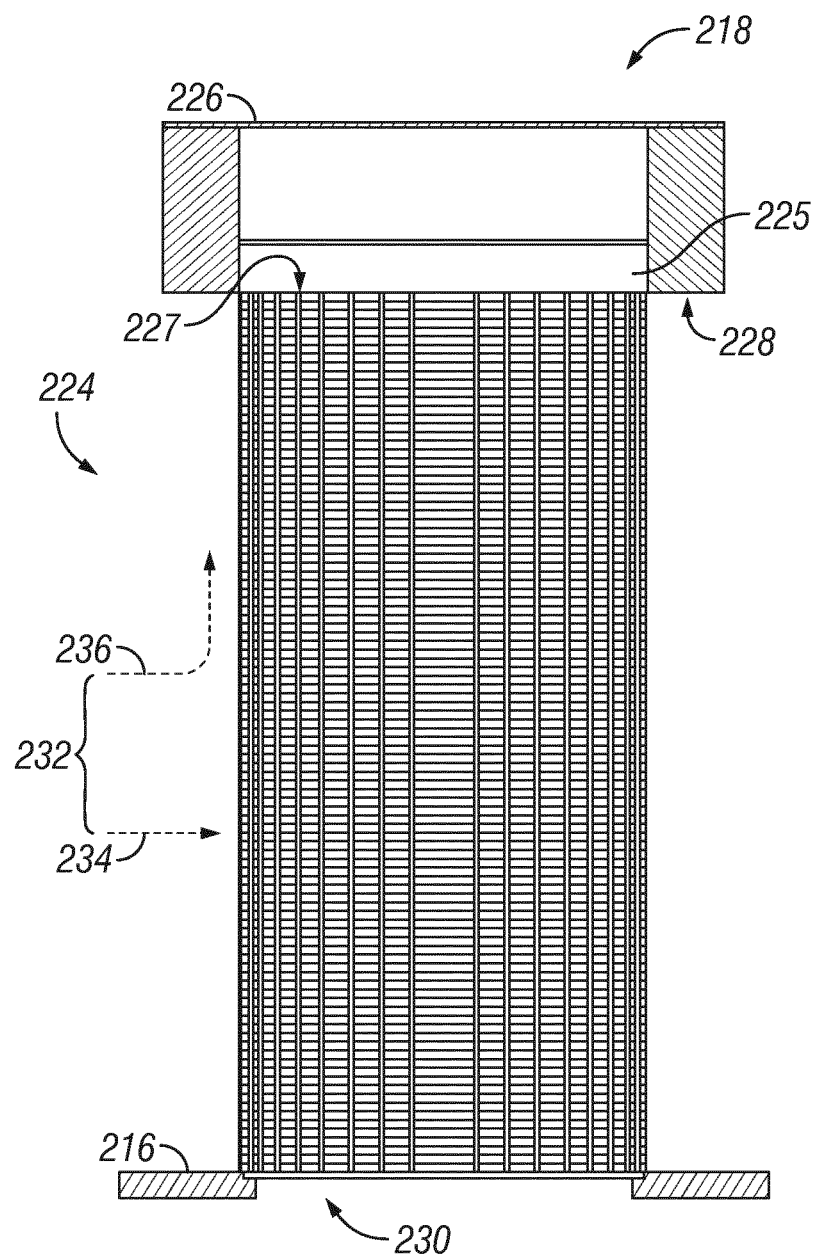
FIG. 2 is a schematic representation of a cross-sectional view of a filter device including a v-wire filter element and cap, in accordance with the present invention.

FIG. 2 is a schematic representation of a cross-sectional view of a filter device 218 including a v-wire filter element 224 and cap 226, in accordance with the present invention. Like numbers are described with respect to FIG. 1. The filter device 218 sits atop an aperture, or opening, 230 in the tray deck 216 of a GPS tray. The body of the device 218 comprises the v-wire filter element 224, which is comprised of a v-wire screen which consists of surface wires welded onto support profiles to create a smooth outer surface for the filter device. A top section of the filter element 224 is not made of v-wire but of a solid circular metal ring 225 that is securely attached to the top section of the filter element. To add, the diameter of the solid circular metal ring corresponds with the diameter of the filter element 224 to form a wholly, singular filter element body. The bottom edge of the solid circular metal ring 225 extends so as to correspond with a bottom edge 227 of the downward rim of the cap 226. The distance between the support profiles is often controlled and continuous so as to form slits (i.e., openings) which allows for a radial flow of a gas-phase feed 232 (i.e., a first portion of feed 234) through the v-wire filter element 224.

For gas-phase feeds, solid particles should be separated from the gas flow before entering the hollow internal passage of the filter element 224. With conventional scale catching trays, the cap 226 of the filter element is extended with a downward vertical rim so that direct horizontal flow of the gas-phase feed into the filter element 224 is no longer possible so that the feed must enter the element via an upward flow. Additionally, when dealing with gas-phase feeds, conventional scale catching trays force solid particles to settle rather than by filtering such particles.

However, use of the v-wire filter element 224 of the present embodiments forces the gas-phase feed to flow both in an upwards direction (i.e., for a second portion of feed 236) along the perimeter of the filter element 224 and in a radial direction (i.e., for the first portion of feed 234) through the filter element 224. As the gas-phase feed 232 flows radially through the slits, entrained solids are prevented from passing through so that a filtered gas-phase stream, substantially free of solids, flows into the hollow internal passage of the element 224.

The first portion of feed 234 is subsequently filtered as it flows radially through the slits of the v-wire filter element 224 and into the hollow internal passage. Any solids bigger than 100 μm that are entrained by the gas-phase feed 232 flowing radially through the v-wire filter 224 will be filtered to settle on the tray deck 216. The second portion 236 of the gas-phase feed 232, which may also contain solids, flows in an upward direction towards the cap 226 that sits atop of the v-wire filter element 224. However, the upwards velocity is lower than the terminal velocity of particles with a diameter of 100 microns and larger. Thus, entrained solids of the second portion 236 flowing in an upwards direction will settle on the deck tray 216 instead of being entrained in the upward flow of feed, thus, ending up on the catalyst beds. The cut-off diameter for particles to settle on the tray deck 216 is determined by the upward gas velocity. By reducing the upward gas velocity, the cut-off particle diameter is smaller, thereby allowing particles with a smaller diameter to settle on the tray.

Figure 3:
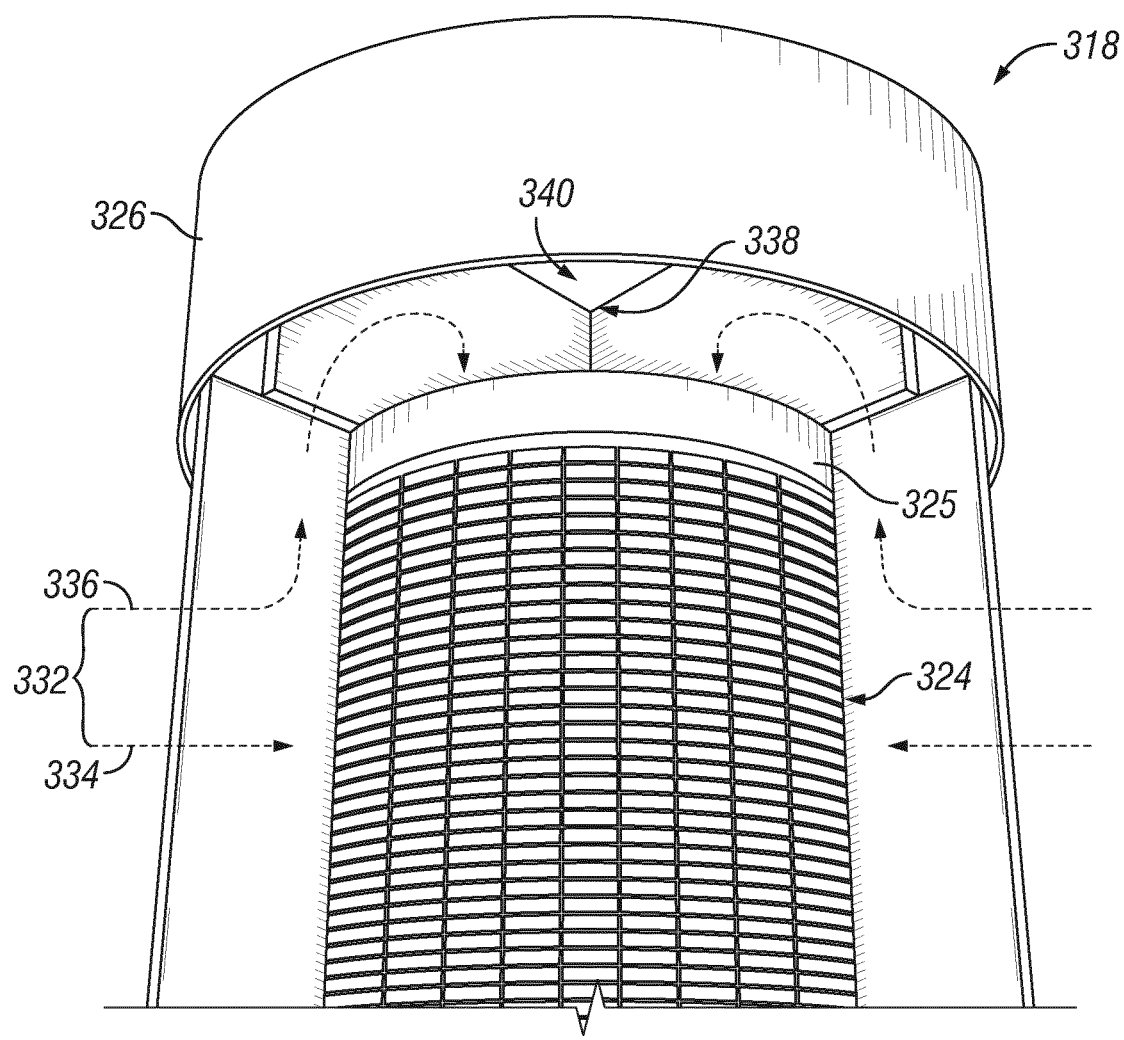
FIG. 3 is a schematic representation of a filter device including a v-wire filter element, cap, and annulus area, in accordance with the present invention.

FIG. 3 is a schematic representation of a filter device 318 including a v-wire filter element 324, cap 326, and annulus area 338, in accordance with the present invention. Like numbers are described with respect to FIGS. 1 and 2. As shown in FIG. 3, a first portion 334 of a gas-phase feed flows radially through the slits of the filter device 318 where a substantial volume of the entrained solids are filtered. Once filtered, a filtered gas stream (i.e., free of entrained small-scaled solids) flows into the hollow internal passage (not shown) of the filter device 318 and further into the reactor chamber (as shown in FIG. 1). Since a majority of the entrained solids have been filtered, a second portion 336 of the gas-phase feed 332 now includes a minimal amount of entrained small-scaled solids. The second portion 336 of the gas-phase feed flows upwards along the outer perimeter of filter element 324 and into an annulus area 338. However, as described with respect to FIG. 2, the upwards velocity of the gas-phase feed is lower than the terminal velocity of the gas-phase feed. This is due in part to the body of the GPS tray being made of v-wire filter screens and the open annulus area located between and in fluid communication with an open top portion of the v-wire filter element 324 and an under-surface 340 of the cap 326. The combined surface area encompassed by the v-wire filter screens and the open annulus area reduces the velocity of the gas as it flows into the filter element 324. In some embodiments of the present invention, the total open slit area of the v-wire filter element 324 is at least twice the size of the open annulus area 340, thus, resulting in a minimized upward gas flow velocity.

The filtered gas-phase feed, combined with the second portion of gas-phase feed, continues a downward flow through the hollow internal passage and further into the reactor chamber. In the present embodiments, the maximum velocity of the gas-phase feed, free of entrained solids, that flows through the hollow internal passage of the filter element 324 is about 1.0 meters/second (m/s).

Accordingly, the present invention is further described by reference to the following non-limiting example depicting the advantages in pressure drop reduction as provided by the present embodiments. It is to be understood that the technique is not intended to be limited to the particular example disclosed.

EXAMPLE

The following Example derives from a real time monitoring performed in reactor vessel V-7609 of Shell Mobile Chemical Plant, Saraland, Alabama, USA, that included the inventive GPS tray and a catalyst bed located below the GPS tray, among other components. It should be noted that although the reactor vessel is generally described herein, it is contemplated that any suitable vessel can be used by one of ordinary skill in order to avoid having the claims limited to only those embodiments disclosed in the specification.

Foulant contaminants at the top of a catalyst bed, generally results in increased pressure drop through the reactor bed, thereby, effectively plugging the bed. Plugging caused by foulants often causes limits in process flows, increased the cycle length, and potentially impact of catalyst activity. Yet, when processing a gas-only phase feed, use of the inventive GPS tray comprising the claimed filter device was shown to reduce the pressure drop increase of the vessel. In addition to removing small scale solids from the gas-phase only feed by settling, filtering, and storing the solids on the tray deck to reduce pressure drop, the filter device of the inventive GPS tray provides several other advantages including distributing gas and any amount of liquid during start-up.

The reactor vessel V-7609 of the Example included a diameter of 2286 millimeters (mm) and a cross-sectional area of 4.1 m$^2$ and was supplied with a 100% gas phase feedstock. The GPS tray was composed of a series of filter devices where the upward velocity of a portion of the feedstock into the annulus of each filter device ranged from about 0.06 to about 0.105 meters/second (m/s). The cylindrical reactor with semi-elliptical heads is a single bed reactor and was loaded with a standard hydrotreating catalyst to process a typical naphtha stream. The overall pressure-drop over the reactor vessel is measured using a differential pressure (DP) cell, and the normalized pressure drop was plotted accordingly.

Figure 4:
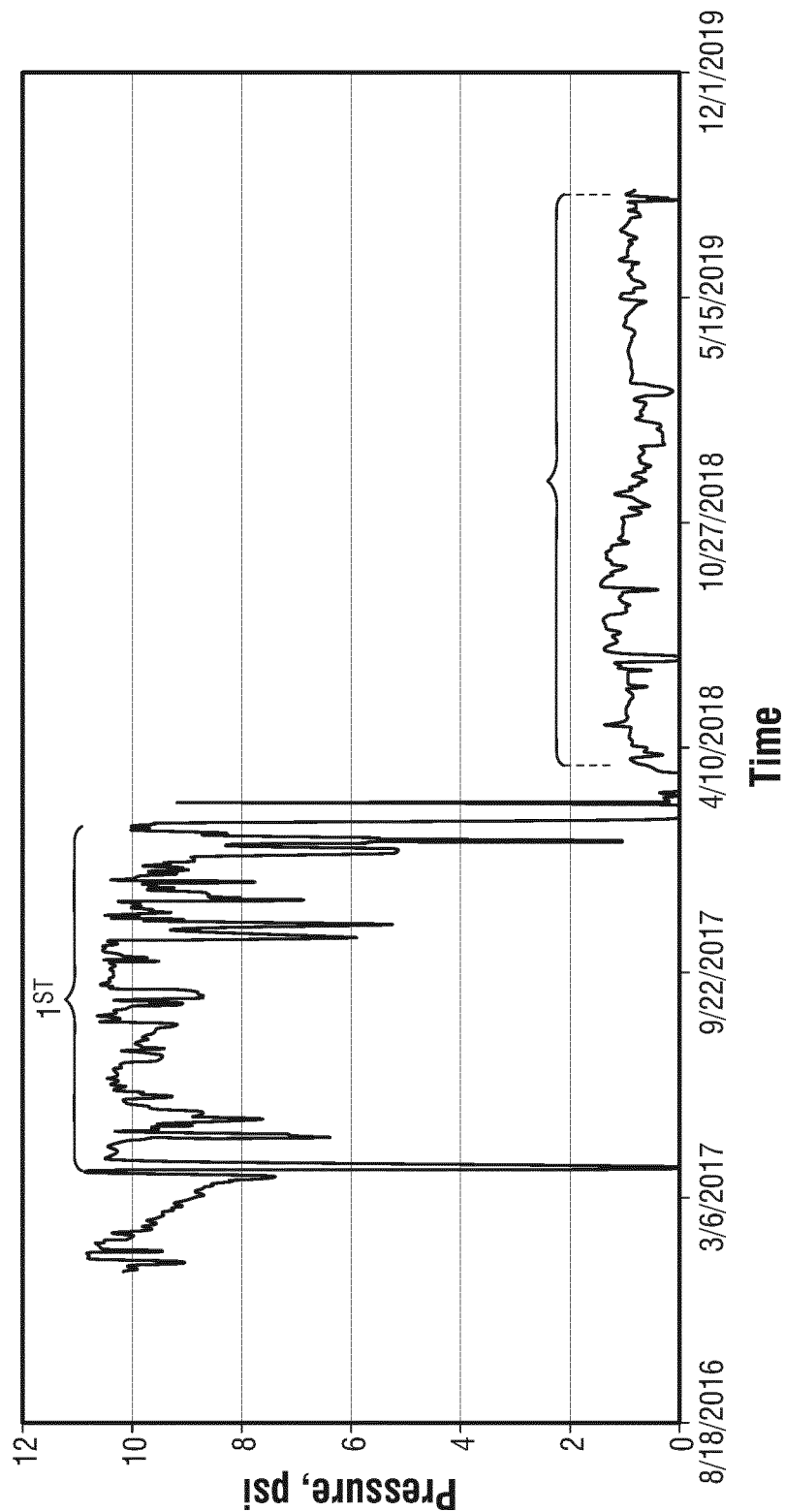
FIG. 4 is a graphical depiction of pressure drop measured in pounds per square inch (psi), as a function of time, across a downflow catalytic bed in a reactor vessel, over two consecutive hydrotreating cycles, the first cycle featuring no GPS tray and the second cycle featuring a GPS tray, in accordance with the present invention.

FIG. 4 is a graphical depiction of pressure drop measured in pounds per square inch (psi), as a function of time, across a downflow catalytic bed in a reactor vessel V-7609, over two consecutive hydrotreating cycles, the first cycle featuring no GPS tray and the second cycle featuring a GPS tray, in accordance with the present invention. During the first (1$^{st}$) hydrotreating cycle, reactor vessel V-7609 was not equipped with a GPS tray but with a conventional Scale Catching Tray. In between the first (1$^{st}$) hydrotreating cycle and the second (2$^{nd}$) hydrotreating cycle, a GPS tray was installed in lieu of the Scale Catching Tray. During the first (1$^{st}$) hydrotreating cycle, the pressure drop fluctuates between 2 psis to 11 psis during a specified time frame. During the second (2$^{nd}$) hydrotreating cycle, the pressure drop is drastically reduced and fluctuates between 0.20 psi to 2 psis during a specified time frame.

This improvement in pressure drop is due to the inherent design of the GPS tray filter devices, tanks to the high filtration efficiency of the V-wire and very low upwards gas velocity through the annulus, which guarantees that all particles equal or bigger than 100 microns in diameter are being trapped before they reach the catalyst bed. The efficiency-enhancing design of the GPS tray means that the pressure drop over the catalyst bed(s) during a defined catalyst cycle length will hardly increase because of accumulation of solid particles inside it. Maximum allowable pressure drop over the tray is about 2 mbars (0.03 psi). The pressure drop over the reactor vessel will generally be between X and X psi, more specifically between X and X psi. In preferred embodiments, the pressure-drop across at least one catalyst bed of the catalytic reactor is less than 0.0145 psi (1 millibar (mbar)) when the GPS tray is installed therein. In case the filter element is fully clogged, the estimated pressure drop over the tray is estimated to be 1.5 mbar (0.022 psi) for a maximum velocity in the filter device of 1 m/s and a high vapor density of 50 kg/m$^3$.

The objective of the present invention includes mitigating costly, performance-limiting fouling in downflow reactors that have a gas-phase only feed. The results of the Example indicate that the objective was met where the inventive GPS tray exhibits tray synergistic behavior by reducing pressure drop and enhancing cycle lengths. As described by the Example, the reduction in pressure drop achieved by use of the GPS tray is pronounced.

The inventive GPS tray, which imparts continuous improvement to reactor internals design, promotes effective fouling abatement due to solid accumulation in gas-phase reactors. Some of the benefits of implementing the GPS tray include significant delay in reactor pressure drop increase, thereby, enhancing cycle length, easy maintenance and installation.

We claim:

1. A device for filtering and settling entrained particles from a gas feed stream, the device comprising:
   a cylindrical v-wire filter element to filter the entrained particles, wherein the v-wire filter element comprises a solid metal ring and a body, wherein the solid metal ring is mounted on a top portion of the body to form a hollow internal passageway of the v-wire filter element, wherein the body comprises slits, wherein a first portion of gas stream flows radially through the slits to form a filtered gas stream, and wherein the hollow internal passageway receives the filtered gas stream;
   a cap located above the v-wire filter element comprising an outer surface, an under surface, and a downward rim attached to a perimeter of the under surface, wherein a bottom edge of the rim is aligned with a bottom edge of the solid metal ring; and
   an open annulus area located between and in fluid communication with an open top portion of the v-wire filter element and the under surface of the cap, wherein a second portion of gas feed stream flows upward along a length of the v-wire filter element, into the open annulus area and downward into the hollow internal passageway.

2. The device of claim 1, wherein the v-wire filter element filters entrained particles with a diameter of 100 microns (μm) and above from the first portion of the gas stream.

3. The device of claim 1, wherein the filtered gas stream flowing through the hollow internal passage comprises a maximum velocity of 1 meter/second (m/s).

4. The device of claim 1, wherein the gas feed stream is essentially in a gaseous phase.

5. A gas-phase settling (GPS) tray installed within a catalytic reactor, the GPS tray comprising:
  a plurality of devices for trapping entrained particles from an inlet gas feed stream by particle filtration and settling, wherein each device comprises:
  a cylindrical v-wire filter element to filter the entrained particles, wherein the v-wire filter element comprises slits and a hollow internal passage, wherein a first portion of gas stream flows radially through the slits to form a filtered gas stream, and wherein the hollow internal passage receives the filtered gas stream;
  a cap located above the v-wire filter element and comprising an outer surface and an under surface; and
  an open annulus area located between and in fluid communication with an opentop portion of the v-wire filter element and the under surface of the cap, wherein a second portion of gas feed stream flows upward along a length of the v-wire filter element, into the open annulus area and downward into the hollow internal passage; and
  a planar surface comprising a plurality of panels, wherein each panel comprises an opening, and wherein the hollow internal passage of each device is located above and aligned with the opening of the panel.

6. The GPS tray of claim 5, wherein the v-wire filter element filters entrained particles with a diameter of 100 microns (μm) and above from the first portion of the gas stream.

7. The GPS tray of claim 5, wherein a total open slit area of the v-wire filter elements is greater than or equal to a total open annulus area.

8. The GPS tray of claim 5, wherein the filtered gas stream flowing through the hollow internal passage comprises a maximum velocity of 1 meter/second (m/s).

9. The GPS tray of claim 5, wherein the gas feed stream is essentially in a gaseous phase.

10. The GPS tray of claim 5, wherein pressure-drop across at least one catalyst bed of the catalytic reactor is less than 0.0145 psi (1 millibar (mbar)) when the GPS tray is installed therein.

11. The GPS tray of claim 5, wherein the v-wire filter element filters entrained particles with a diameter of 100 μm and above from the first portion of the gas stream, wherein the entrained particles settle on the planar surface.

12. The GPS tray of claim 5, wherein the velocity of the second portion of the gas stream flowing upwards through the open annulus area is lower than the terminal velocity of particles with a diameter of 100 μm.

13. The GPS tray of claim 5, wherein the GPS tray is installed above a top catalyst bed of the catalytic reactor.

14. A method for removing entrained particles from an inlet gas feed stream flowing into a catalytic reactor, the method comprising:
  (a) flowing the inlet gas feed stream into a top inlet of the catalytic reactor; and
  (b) subjecting the inlet gas feed stream to a gas-phase settling (GPS) tray installed within the catalytic reactor, the GPS tray comprising:
    a plurality of devices for trapping entrained particles from an inlet gas feed stream by particle filtration and settling, wherein each device comprises:
    a cylindrical v-wire filter element to filter the entrained particles, wherein the v-wire filter element comprises slits and a hollow internal passage, wherein a first portion of gas stream flows radially through the slits to form a filtered gas stream, and wherein the hollow internal passage receives the filtered gas stream;
    a cap located above the v-wire filter element and comprising an outer surface and an under surface; and
    an open annulus area located between and in fluid communication with an open top portion of the v-wire filter element and the under surface of the cap, wherein a second portion of gas feed stream flows upward along a length of the v-wire filter element, into the open annulus area and downward into the hollow internal passage; and
    a planar surface comprising a plurality of panels, wherein each panel comprises an opening, and wherein the hollow internal passage of each device is located above and aligned with an opening of the panel.

15. The method of claim 14, wherein pressure-drop across at least one catalyst bed of the catalytic reactor is less than 0.0145 psi (1 millibar (mbar)) when the GPS is installed therein.

16. The method of claim 14, wherein the filtered gas stream flowing through the hollow internal passage comprises a maximum velocity of the 1 meter/second (m/s).

* * * * *